(12) United States Patent
Tang et al.

(10) Patent No.: US 10,296,531 B2
(45) Date of Patent: May 21, 2019

(54) VISUAL SEMANTIC COMPLEX NETWORK AND METHOD FOR FORMING NETWORK

(71) Applicant: BEIJING SENSETIME TECHNOLOGY DEVELOPMENT CO., LTD, Beijing (CN)

(72) Inventors: Xiaoou Tang, Shatin Hong Kong (CN); Shi Qiu, Shatin Hong Kong (CN); Xiaogang Wang, Shatin Hong Kong (CN)

(73) Assignee: Beijing Sensetime Technology Development Co., Ltd., Beijing (CN)

( * ) Notice: Subject to any disclaimer, the term of this patent is extended or adjusted under 35 U.S.C. 154(b) by 313 days.

(21) Appl. No.: 15/100,152

(22) PCT Filed: Nov. 30, 2013

(86) PCT No.: PCT/CN2013/088258
§ 371 (c)(1),
(2) Date: May 27, 2016

(87) PCT Pub. No.: WO2015/078022
PCT Pub. Date: Jun. 4, 2015

(65) Prior Publication Data
US 2017/0046427 A1    Feb. 16, 2017

(51) Int. Cl.
*G06F 16/36*   (2019.01)
*G06F 16/54*   (2019.01)
(Continued)

(52) U.S. Cl.
CPC ........... *G06F 16/367* (2019.01); *G06F 16/36* (2019.01); *G06F 16/54* (2019.01); *G06F 16/583* (2019.01);
(Continued)

(58) Field of Classification Search
CPC ........... G06F 17/30265; G06F 17/3026; G06F 17/30672
See application file for complete search history.

(56) References Cited

U.S. PATENT DOCUMENTS

| 7,996,762 B2 | 8/2011 | Qi et al. |
| 2005/0162523 A1* | 7/2005 | Darrell .............. G06F 17/30277 348/211.2 |

(Continued)

FOREIGN PATENT DOCUMENTS

| CN | 101751447 A | 6/2010 |
| CN | 102902821 A | 1/2013 |
| JP | H-0744543 A | 2/1995 |

OTHER PUBLICATIONS

Wikipedia, Concept mining (Year: 2013).*
(Continued)

*Primary Examiner* — William Spieler
(74) *Attorney, Agent, or Firm* — Mintz Levin Cohn Ferris Glovsky and Popeo, P.C.

(57) ABSTRACT

A visual semantic complex network system and a method for generating the system have been disclosed. The system may comprise a collection device configured to retrieve a plurality of images and a plurality of texts associated with the images in accordance with given query keywords; a semantic concept determination device configured to determine semantic concepts of the retrieved images and retrieved texts for the retrieved images, respectively; a descriptor generation device configured to, from the retrieved images and texts, generate text descriptors and visual descriptors for the determined semantic concepts; and a semantic correlation device configured to determine semantic correlations and visual correlations from the generated text and visual descriptor, respectively, and to combine the determined (Continued)

semantic correlations and the determined visual correlations to generate the visual semantic complex network system.

12 Claims, 5 Drawing Sheets

(51) Int. Cl.
  *G06F 16/583* (2019.01)
  *G06F 16/901* (2019.01)
(52) U.S. Cl.
  CPC ...... *G06F 16/5846* (2019.01); *G06F 16/9024* (2019.01)

(56) References Cited

U.S. PATENT DOCUMENTS

| | | | | |
|---|---|---|---|---|
| 2006/0112092 | A1* | 5/2006 | Ziou | G06F 17/30274 |
| 2007/0271226 | A1* | 11/2007 | Zhang | G06F 17/30265 |
| 2009/0290812 | A1* | 11/2009 | Naaman | G06F 17/30241 382/305 |
| 2011/0072048 | A1 | 3/2011 | Hua et al. | |
| 2011/0211736 | A1* | 9/2011 | Krupka | G06F 17/30259 382/118 |
| 2012/0102033 | A1 | 4/2012 | Sarshar et al. | |
| 2014/0029839 | A1* | 1/2014 | Mensink | G06K 9/6272 382/159 |
| 2015/0254280 | A1* | 9/2015 | Wang | G06F 17/3053 707/723 |

OTHER PUBLICATIONS

Wikipedia, k-nearest neighbors algorithm (Year: 2013).*
Jing, Yushi, and Shumeet Baluja. "Visualrank: Applying pagerank to large-scale image search." IEEE Transactions on Pattern Analysis and Machine Intelligence 30.11 (2008): 1877-1890. (Year: 2008).*
Manning, Christopher D., Prabhakar Raghavan, and Hinrich Schütze. Introduction to information retrieval. New York: Cambridge University Press, 2008 (Year: 2009).*
Extended European Search Report dated Jul. 24, 2017, for EP Application No. 13898402.6, 10 pages.
Fan, J. et al. (Jul. 8, 2009). "Integrating Visual and Semantic Contexts for Topic Network Generation and Word Sense Disambiguation," *Proceedings of the ACM International Conference on Image and Video Retrieval*, ACM Press, New York, New York, 8 pages.
Korean Office Action for KR Application No. 10-2016-7015299, with concise explanation of references, 7 pages.
Boccaletti, S. et al., "Complex networks: Structure and dynamics," *Physics Reports* (Available online Jan. 10, 2006) 424:175-308.
Chechik, Gal et al., "An Online Algorithm for Large Scale Image Similarity Learning," (Part of) *Advances in Neural Information Processing Systems 22* (Neural Information Processing Systems Conference 2009); 9 pages.
Cui, Jingyu et al., "Real Time Google and Live Image Search Re-ranking," *MM'08 Proceedings of the 16th ACM International Conference on Multimedia* (Oct. 26-31, 2008, Vancouver, British Columbia, Canada); pp. 729-732.
Cui, Jingyu et al., "IntentSearch: Interactive On-line Image Search Re-ranking," *MM'08 Proceedings of the 16th ACM International Conference on Multimedia* (Oct. 26-31, 2008, Vancouver, British Columbia, Canada); pp. 997-998.
Deng, Jia et al., "ImageNet: A Large-Scale Hierarchical Image Database," *Computer Vision and Pattern Recognition* (Jun. 20-25, 2009; IEEE Conference); 8 pages.
Deng, Jia et al., "Hierarchical Semantic Indexing for Large Scale Image Retrieval," *Computer Vision and Pattern Recognition* (Jun. 20-25, 2011; IEEE Conference); pp. 785-792.
Douze, Matthijs et al., "Combining attributes and Fisher vectors for efficient image retrieval," *Computer Vision and Pattern Recognition* (Jun. 20-25, 2011; IEEE Conference); pp. 745-752.

Gong, Yunchao et al., "Iterative Quantization: A Procrustean Approach to Learning Binary Codes,", *Computer Vision and Pattern Recognition* (Jun. 20-25, 2011; IEEE Conference); pp. 817-824.
Jégou, Hervé et al., "Aggregating local image descriptors into compact codes," *IEEE Transactions on Pattern Analysis and Machine Intelligence* (submitted on Oct. 17, 2011; date of publication Dec. 13, 2011) 34(9):1704-1716.
Langville, Amy N. et al., "Deeper Inside PageRank," *Internet Mathematics* (Oct. 20, 2004); 33 pages.
Lewandowski, Dirk, "Search engine user behavior: How can users be guided to quality content?" *Information Services & Use* (2008; DOI 10.3233/ISU-2008-0583); 28(3-4):261-268.
Liu, Hao et al., "Effective Browsing of Web Image Search Results," *MIR-04 Proceedings of the 6th ACM SIGMM International Workshop on Multimedia Information Retrieval* (Oct. 15-16, 2004; New York, NY); pp. 84-90.
Lu, Yijuan et al., "Constructing Concept Lexica With Small Semantic Gaps," *IEEE Transactions on Multimedia* (Jun. 2010; current version published May 14, 2010); 12(4):288-299.
Manku, Gurmeet Singh et al., "Detecting Near-Duplicates for Web Crawling," *WWW'07 Proceedings of the 16th International Conference on World Wide Web* (May 8-12, 2007, Banff, Alberta, Canada); pp. 141-150.
Nistér, David et al., "Scalable Recognition with a Vocabulary Tree," *Computer Vision and Pattern Recognition* (Jun. 17-22, 2006; IEEE Computer Society Conference); 8 pages.
Qiu, Shi et al., "Anchor Concept Graph Distance for Web Image Re-ranking," *MM'13 Proceedings of the 21st ACM International Conference on Multimedia* (Oct. 21-25, 2013, Barcelona, Spain); pp. 713-716.
Sahami, Mehran et al. "A web-based kernel function for matching short text snippets." *International Workshop on Learning in Web Search* (LWS 2005); pp. 2-9.
Tang, Xiaoou et al., "IntentSearch: Capturing User Intention for One-Click Internet Image Search," *IEEE Transactions on Pattern Analysis and Machine Intelligence* (Jul. 2012 [published Dec. 13, 2011]); 34(7):1342-1353.
Torralba, Antonio et al., "80 million tiny images: a large dataset for non-parametric object and scene recognition," *IEEE Transactions on Pattern Analysis and Machine Intelligence* (Nov. 2008 [published May 30, 2008]); 30(11):1958-1970.
Tsai, David et al., "Large-Scale Image Annotation using Visual Synset," *Computer Vision (ICCV)* (Nov. 6-13, 2011; IEEE International Conference); 8 pages.
Verma, Nakul et al., "Learning Hierarchical Similarity Metrics," *Computer Vision and Pattern Recognition (CVPR)* (Jun. 16-21, 2012; IEEE Conference); 8 pages.
Wang, Xin-Jing et al., "Towards Indexing Representative Images on the Web," *MM'12 Proceedings of the 20th ACM International Conference on Multimedia* (Oct. 29-Nov. 2, 2012; Nara Japan); pp. 1229-1238.
Wang, Xiaogang et al., "Web Image Re-Ranking Using Query-Specific Semantic Signatures," *IEEE Transactions on Pattern Analysis and Machine Intelligence* (Apr. 2014 [current version Mar. 19, 2014)]; vol. 36, No. 4; 14 pages.
Wang, Xiaogang et al., "Query-Specific Visual Semantic Spaces for Web Image Re-ranking," *Computer Vision and Pattern Recognition (CVPR)* (Jun. 20-25, 2011; IEEE Conference); pp. 857-884.
Wang, Shuo et al., "IGroup: Presenting Web Image Search Results in Semantic Clusters," *CHI'07 Proceedings of the SIGCHI Conference on Human Factors in Computing Systems* (Apr. 28-May 3, 2007; San Jose, California); pp. 587-596.
Wilkinson, Leland et al., "Statistical Methods in Psychology Journals—Guidelines and Explanations," *American Psychologist* (Aug. 1999); 54(8):594-604.
Wu, Zhong et al., "Bundling Features for Large Scale Partial-Duplicate Web Image Search," *Computer Vision and Pattern Recognition* (Jun. 20-25, 2009; IEEE Conference); pp. 25-32.
Zhang, Wei et al., "Graph Degree Linkage: Agglomerative Clustering on a Directed Graph," *Computer Vision—ECCV 2012* (12th European Conference on Computer Vision, Florence, Italy, Oct. 7-13, 2012; Proceedings, Part I); 14 pages.

(56) References Cited

OTHER PUBLICATIONS

International Search Report with Written Opinion corresponding to International Patent Application No. PCT/CN2013/088258, dated Sep. 24, 2014, 8 pages.

* cited by examiner

VISUAL SEMANTIC COMPLEX NETWORK AND METHOD FOR FORMING NETWORK

TECHNICAL FIELD

The present application refers to a visual semantic complex network system and a method for generating the system.

BACKGROUND

The enormous and ever-growing amount of images on the web has inspired many important applications related to web image search, browsing, and clustering. Such applications aim to provide users with easier access to web images. An essential issue facing all these tasks is how to model the relevance of images on the web. This problem is particularly challenging due to the large diversity and complex structures of web images. Most search engines rely on textual information to index web images and measure their relevance. Such an approach has some well known drawbacks. Because of the ambiguous nature of textual description, images indexed by the same keyword may come from irrelevant concepts and exhibit large diversity on visual content. More importantly, some relevant images under different keyword indices such as "palm pixi" and "apple iphone" fail to be connected by this approach. Another approach estimates image relevance by comparing visual features extracted from image contents. Various approximate nearest neighbor (ANN) search algorithms (e.g. hashing) have been used to improve the search efficiency. However, such visual features and ANN algorithms are only effective for images with very similar visual content, i.e. near duplicate, and cannot find relevant images that have the same semantic meaning but moderate difference in visual content.

Both of the above approaches only allow users to interact with the huge web image collections at a microscopic level, i.e. exploring images within a very small local region either in the textual or visual feature space, which limits the effective access of web images. Although efforts have been made to manually organize portions of web images, it is derived from a human-defined ontology that has inherent discrepancies with dynamic web images. It is also very expensive to scale.

SUMMARY

The purpose of this application is to automatically discover and model the visual and semantic structures of web image collections, study their properties at a macroscopic level, and demonstrate the use of such structures and properties through concrete applications. To this end, the present application proposes to model web image collections using the Visual Semantic Complex Network (VSCN), an automatically generated graph structure on which images that are relevant in both semantics and visual content are well connected and organized.

It shall be noted that images on the web are not distributed randomly, but do tend to form visually and semantically compact clusters. These image clusters can be used as the elementary units for modeling the structures of web image collections. The represent application automatically discovers image clusters with both semantic and visual consistency, and treats them as nodes on the graph.

In the disclosures of the application, the discovered image clusters is called as semantic concepts, and are associated them with visual and textual descriptors. The semantic concepts are connected with edges based on their visual and semantic correlations. The semantic concepts and their correlations bring structures to web images and allow more accurate modeling of image relevance.

It will be a better understanding of web image collections at a macroscopic level by studying the structural properties of the VSCN from the perspective of complex network. The present application explores a few of them, including small-world behavior, concept community, hub structures, and isolated concepts, and reveal some interesting findings. Such properties provide valuable information that opens doors for many important applications such as text or content-based web image retrieval, web image browsing, discovering popular web image topics, and defining image similarities based on structural information.

The application is proposed to address two applications: content-based image retrieval (CBIR) and image browsing. For web-scale CBIR, existing approaches typically match images with visual features and ANN search algorithms (e.g. hashing). These algorithms often lead only to a small portion of images highly similar to the query (near duplicate). In this work, these detected images are connected to other relevant images that form community structures on the VSCN. Therefore, many more relevant images can be found by exploiting the structural information provided by the VSCN. In the second application, a novel visualization scheme is proposed for web image browsing. Users can explore the web image collections by navigating the VSCN without being limited by query keywords.

In one aspect, the present application provides a visual semantic complex network system for Web Images, comprising:

a collection device configured to retrieve a plurality of images and a plurality of texts associated with the images in accordance with given query keywords;

a semantic concept determination device configured to determine semantic concepts and representative images of the retrieved texts and retrieved images, respectively;

a descriptor generation device configured to, from the determined semantic concepts and representative images, generate text descriptors and visual descriptors; and a correlation device configured to determine semantic correlations and visual correlations from the generated text and visual descriptors, respectively, and to combine the determined semantic correlations and the determined visual correlations to generate the visual semantic complex network system.

In another aspect, the present application provides a method for forming a visual semantic complex network system for Web images, comprising:

retrieving a plurality of images and a plurality of texts associated with the images in accordance with given query keywords;

determining semantic concepts and representative images of the retrieved texts and retrieved images, respectively;

generating, from the semantic concepts and representative images, text descriptors and visual descriptors; and determining semantic correlations and visual correlations from the generated text descriptor and the generated visual descriptor, respectively, combining the semantic correlations and visual correlations to generate the visual semantic complex network system.

The above method may be carried out by one or more processor in the computer.

In another aspect, the present application provides a computer readable storage media comprising:

instructions for retrieving a plurality of images and a plurality of texts associated with the images in accordance with given query keywords;

instructions for determining semantic concepts and representative images of the retrieved texts and retrieved images, respectively;

instructions for generating, from the semantic concepts and representative images, text descriptors and visual descriptors; and instructions for determining semantic correlations and visual correlations from the generated text descriptor and the generated visual descriptor, respectively, instructions for combining the semantic correlations and visual correlations to generate the visual semantic complex network system.

In another aspect, the present application provides a method for searching images with the visual semantic complex network system, comprising:

obtaining a list of images according to a given query image;

determining a group of related concept communities from the obtained list;

determining a group of related semantic concepts from the communities;

gathering, from the determined related semantic concepts, images of a top plurality of concepts; and forming a re-ranking pool of the gathered images, which are matched with the query image.

Accordingly, a computer readable storage media is provided and comprises:

instructions for obtaining a list of images according to a given query image;

instructions for determining a group of related concept communities from the obtained list;

instructions for determining a group of related semantic concepts from the communities;

instructions for gathering, from the determined related semantic concepts, images of a top plurality of concepts; and instructions for forming a re-ranking pool of the gathered images, which are matched with the query image.

In another aspect, the present application further provides a method for browsing images with semantic concepts. The semantic concepts may be generated in the visual semantic complex network system for Web Images as mentioned in the above. The method may comprises:

entering a query keyword into a display system;

generating a plurality of semantic concepts based on same queries as the entered keyword;

visualizing the generated semantic concepts in a query space of the display system;

switching the query space to a local concept space of the display unit in response to selecting a concept selected from the query space, wherein on the local concept space the selected concept together with its neighbor concepts is shown.

In addition, the method for browsing images may further comprises:

selecting a centric concept in the local concept space; and switching back to the query space that the selected concept belongs to.

selecting another concept in the local concept space; and switching to another local concept space where said another concept and its neighbor concepts are shown.

The above method may be carried out by one or more processor in the computer.

DETAILED DESCRIPTION

Embodiments of the present application can solve a problem of wasting storage resources or depicting inaccurately during document rendering. Thus, a technical effect of reducing storage space while improving rendering accuracy can be achieved.

Figure 1:
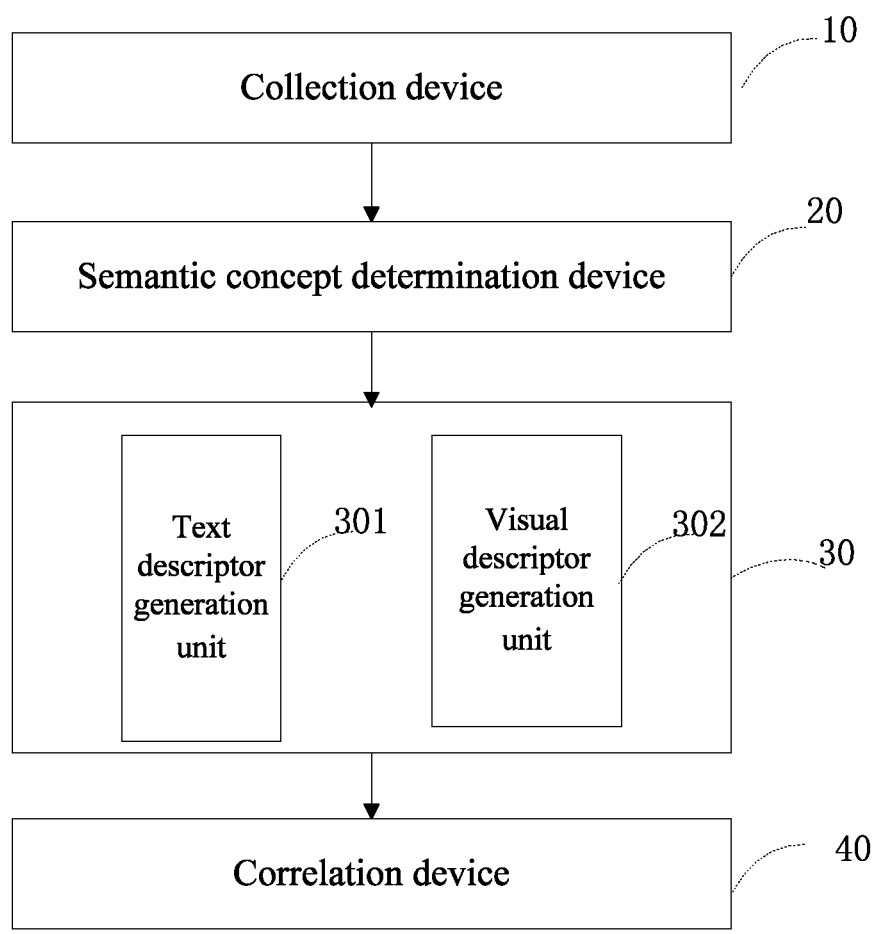
FIG. 1 illustrates a block view of the exemplary visual semantic complex network system for Web Images according to one embodiment of the present application.

FIG. 1 illustrates a block view of the exemplary visual semantic complex network system 100 for Web Images according to one embodiment of the present application. As shown in FIG. 1, the system 100 comprises a collection device 10, a semantic concept determination device 20, a descriptor generation device 30 and a correlation device 40.

The collection device 10 is configured to retrieve a plurality of images and texts in accordance with given query keywords. In embodiments of the application, it starts with a plurality of top query keywords of a search engine, and then automatically discovers a larger number of (semantic concepts that are compact image clusters with visual and semantic consistency. In one instance, take Bing image search engine as example, if there is for example, 2,000 keywords of the search engine, there will be about 33,240 semantic concepts to be discovered.

The semantic concept determination device 20 is configured to determine semantic concepts and representative images of the retrieved texts and retrieved images. In one embodiment of the present application, the semantic concept determination device 20 learns the semantic concepts by discovering keywords that occur frequently in visually similar images. These discovered keywords correlate well with the image content and therefore leads to descriptive concepts. To be specific, for every query q, e.g. "apple", we submit q to an image search engine. With the retrieved collection of images $I_q$ and surrounding texts $T_q$, their relevant semantic concepts, such as "apple fruit" and "apple iphone", can be automatically discovered. Such concepts have more specific semantic meanings and less visual diversity, and can be viewed as elementary units of web image collections. The learned concepts under query keyword q are denoted as $C_q = \{c_i\}_{i=1}^{M_q}$. The concepts were learned from different queries form the nodes of the VSCN 100.

The following is a summarized process of the concept discovery.

Algorithm 1 Concept Discovery through Query Expansion

Input: Query q, image collection $I_q$, surrounding texts $T_q$.
Output: Learned concept set $C_q = \{c_i\}_{i=1}^{M_q}$.
1:   Intialization: $C_q := \emptyset$, $r_I(w) := 0$.
2:   for all images $I_k \in I_q$ do
3:       Find the top K visual neighbors, denote as $N(I_k)$
4:       Let $W(I_k) = \{w_{I_k}^i\}_{i=1}^T$ be the T most frequent words in the surrounding texts of $N(I_k)$.
5:       for all words $w_{I_k}^i \in W(I_k)$ do
6:           $r_I(w_{I_k}^i) := r_I(w_{I_k}^i) + (T - i)$.
7:       end for
8:   end for
9:   Combine q and the $M_q$ words with largest $r_I(w)$ to form $C_q$.

The descriptors generation device 30 is configured to, from the retrieved images, the retrieved texts and elementary units, generate a text descriptor and a visual descriptor for the determined semantic concepts. As the number of concepts is very large (for example, 33,240 in the embodiment, and potentially even larger if we expand the VSCN), two efficient methods to compute semantic and visual correlations will be described below.

In particular, the descriptor generation device 30 comprises a text descriptor generation unit 301 and a visual descriptor generation unit 302.

In one embodiment, the text descriptor generation unit 301 operates to collect the text snippets corresponding to the semantic concepts, compute/determine the term frequency (TF) vector of the collected snippets to keep a first plurality of terms in the vector with the highest term frequency (that is, the other terms in the vector will be cancelled), and thus the computed the term frequency vector is truncated. And then the text descriptor generation unit 301 operates to normalize the truncated vectors and determine the semantic correlation from the truncated vectors. For example, the text descriptor generation unit 301 operates to $L_2$-normalize the truncated vectors.

Figure 2:
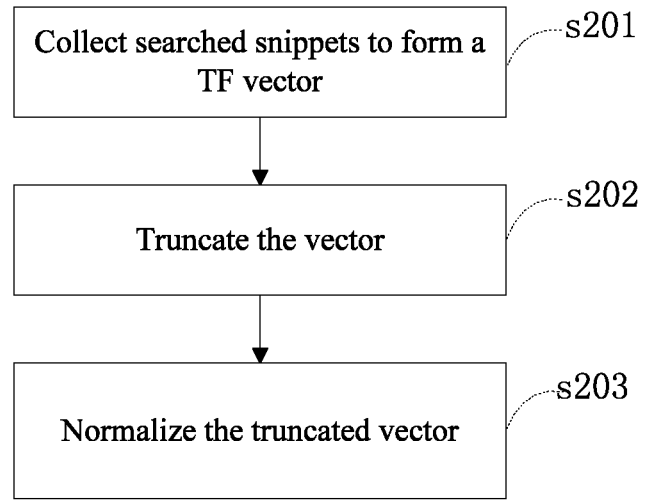
FIG. 2 is a flowchart of a method for generating semantic descriptors according to one embodiment of the present application.

To be specific, for each concept $c_1 \in C$, the text descriptor generation unit 301 may operate to carry out the following steps as shown in FIG. 2. At step s201, the text descriptor generation unit 301 utilizes $c_i$ as a query input on the web search (for example, Google web search), and collect the top K (for example, K=50) searched snippets, denoted as $S(c_i)$. At step s202, the text descriptor generation unit 301 computes/determines the term frequency (TF) vector of $S(c_i)$ and keeps, for example, the top M (for example, K=100) terms with highest TFs, that is, the TF vector is truncated. At step s203, the text descriptor generation unit 301 normalizes the truncated vector to form text descriptor.

The visual descriptor generation unit 302 is configured to encode each of the retrieved images by a hashing function H so as to generate a binary vector for each retrieved image, accumulate the generate binary vectors and quantize the accumulated vector back to binary vector such that a visual correlation (visual descriptor) between each two of the concept will be formed from the quantized binary vector.

Figure 3:
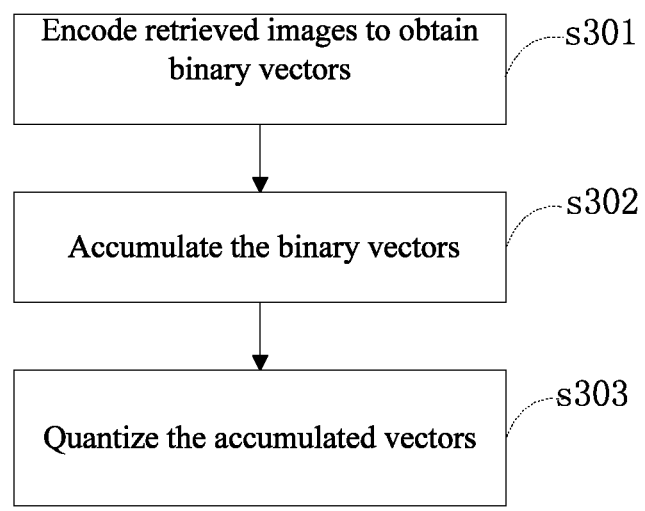
FIG. 3 is a flowchart of a method for generating visual descriptors according to one embodiment of the present application.

To be specific, the visual descriptor generation unit 302 may operate to carry out the following steps as shown in FIG. 3. At step S301, for a concept $c_i \in C$, its exemplar image set by $I_{ci}$, $I_k \in I_{ci}$ is encoded in an M-dimensional binary vector $H(I_k)$ using an M-bit base hashing function H (Here we represent each bit with ±1). At step S302, the visual descriptor generation unit 302 operates to accumulate the binary vectors as $A = \Sigma H(I_k)$. At step 303, the visual descriptor generation unit 302 operates to quantize the accumulated vectors back to binary vector, which is donated as visual descriptor $simhash(c_i) = sign(A)$.

The correlation device 40 is configured to determine the semantic correlation from the generated text and visual descriptor so as to combine the semantic correlation and visual correlation to generate a K-nearest-neighbor (K-NN) graph network system.

The semantic correlation may be determined by using the conventional means. For example, for a short text x, a set of snippets $S(x)$ is obtained from the web search. A snippet is a short text summary generated by the search engine for each search result item with query c. The text descriptor generation unit 301 collects the snippets of the top N search result items, which provide rich semantic context for x. And then the text descriptor generation unit 301 operates to determine the similarity between two texts $x_1$ and $x_2$ by computing the textual similarity between $S(x_1)$ and $S(x_2)$ using the term vector model and cosine similarity.

After the result vector $ntf(c_i)$ as the text descriptors is determined as shown in FIG. 2, the correlation device 40 operates to determine the semantic correlation between $c_i$ and $c_j$ by rule of:

$$S\_Cor = Cosine(ntf(c_i), ntf(c_j)). \qquad (1)$$

As to the visual correlation, it may be measured by the visual similarity between their corresponding exemplar image sets. For each concept, its exemplar image set consists of the top K (for example, 300) images retrieved from the search engine by using the concept as query keyword. This exemplar image set is further represented as a binary code by the conventional sim-hashing algorithm. This sim-hashing code can be viewed as a visual signature of the original exemplar image set. The visual similarity between any pair of exemplar image sets can then be approximated by the negative of hamming distance between their sim-hashing codes. To be specific, once the visual descriptor $simhash(c_i) = sign(A)$ is determined by unit 302 at step S303, the correlation device 40 operates to determine the visual correlation between $c_i$ and $c_j$ by rule of, $$V\_Cor = 1 - \frac{1}{M} HamDist(simhash(c_i), simhash(c_j)). \qquad (2)$$

And then, the correlation device 40 operates to combine the semantic correlation and visual correlation by $Cor = S\_cor + V\_cor$. Finally, the system 100 build the VSCN as a K-nearest-neighbor (K-NN) graph by connecting each node to its top K neighbors with the largest correlations.

Figure 4:
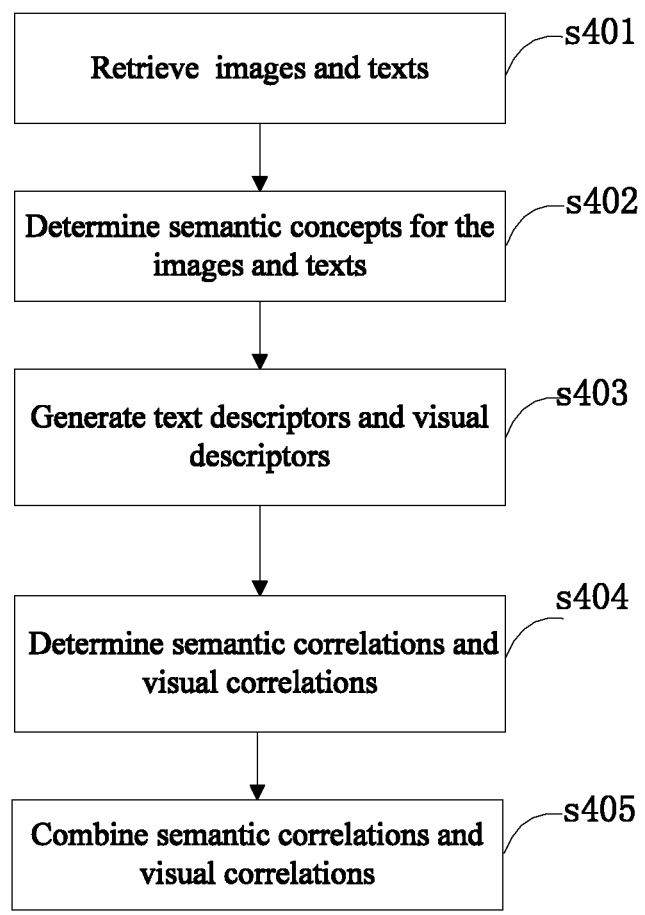
FIG. 4 is a flowchart of a process for forming a visual semantic complex network system for Web images according to an embodiment of the present application.

Hereinafter, the present application also proposes a process 400 for forming a visual semantic complex network system for Web images. As shown in FIG. 4, in step S401, the process retrieve a plurality of images and a plurality of texts associated with the images in accordance with given query keywords.

In step S402, the process determines semantic concepts and representative images of the retrieved texts and retrieved images.

In step S403, the process generates, from the determined semantic concepts and representative image, text descriptors and visual descriptors for the determined semantic concepts. The step S403 may comprise the step of determining semantic correlations and visual correlations from the generated text descriptor and the generated visual descriptor as discussed in reference to FIGS. 2 and 3 above.

In step S404, the process determines semantic correlations and visual correlations from the generated text descriptor and the generated visual descriptor, respectively. Specifically, a semantic correlation between each two of the text concepts may be generated by collecting a plurality of text snippets corresponding to the semantic concepts, determining a term frequency vector of the collected snippets; truncating the computed vector such that a plurality of terms in the vector with the highest term frequency is maintained; and normalizing the truncated vectors to generate said text descriptors, such that the visual correlation between each two of the text concepts are generated from the quantized binary vector. The visual correlation may be generated by encoding each of the retrieved images by a hashing function so as to generate a binary vector for each retrieved image, accumulating the generate binary vectors; quantizing the accumulated vector back to a binary vector as said visual descriptor; and determining the visual correlation from the truncated vectors. The generations of the semantic correlation and the visual correlation have been discussed in the above, and thus the detailed descriptions thereof are omitted.

In step S405, the process 400 combines the semantic correlations and visual correlations to generate the visual semantic complex network system.

As well known in the art, the complex networks have many important properties, some of which are explored with the proposed VSCN 100. The study of these properties not only yields a better understanding of web image collections at a macroscopic level, but also provides valuable information that assists in important tasks including CBIR and image browsing, as will be discussed later.

1) Small-World Behavior

The small-world behavior exists in many complex networks such as social networks and the World Wide Web. It means that most nodes can be reached from the others in a small number of hops. It is of great interest to study whether this phenomenon also exists in our VSCN 100. The small-world behavior has important implications in some applications such as image browsing by navigating the VSCN 100.

As the VSCN 100 is constructed locally, it is interesting to know how it is globally connected. It finds that even for a small neighborhood size (K=5), there already emerges a dominant connected component that includes more than half of the nodes on the VSCN, as shown in FIG. 3 (a). The largest connected component grows quickly with K and covers 96% of the VSCN when K=20. Thus, the VSCN is a well connected network.

The average shortest path length is determined by $$L = \frac{1}{|V|(|V|-1)} \Sigma_{v_i, v_j \in V, v_i \neq v_j} d(v_i, v_j). \quad (3)$$

V is defined as the largest connected component to avoid divergence of L. FIG. 3 (a) shows L as a function of K. L drops quickly at the beginning. For K>20, the average separation between two nodes on the largest connected components is only about six hops. The existence of a dominant connected component and its small separation between nodes suggest it is possible to navigate the VSCN 100 by following its edges, which inspires the novel image browsing scheme as will be discussed below. Hereinafter, K will be fixed at 20 for purpose of description, but the present application is not limited thereto.

2) In-degree Distribution

Figure 5:
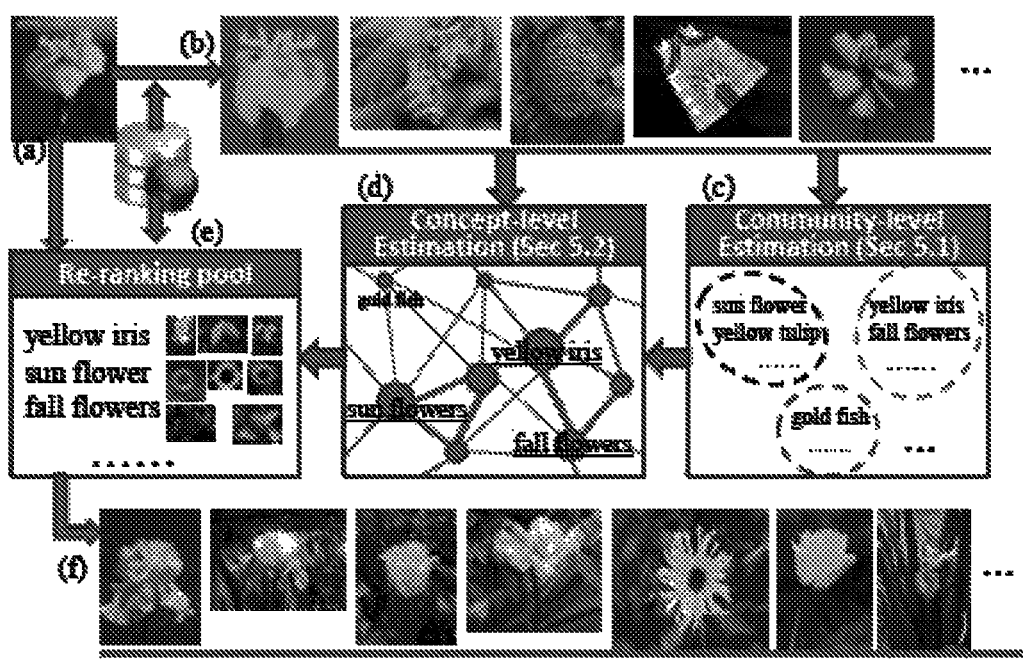
FIG. 5 (a)-(f) is illustrates a block view of how to search images with the visual semantic complex network system according to an embodiment of the present application

In-degree is an important measurement in complex networks. On the VSCN 100, the nodes have identical out-degree (for example, K=20), but their in-degrees differ widely from 0 to 500. Only 1% of nodes have in-degrees larger than 100. In general, representative and popular concepts that are neighbors of many other concepts have high in-degrees, and form hub structures. Isolated concepts have zero in-degree. They are typically uncommon concepts such as "geodesic dome" and "ant grasshopper", or the failures of concept detection such as "dscn jpg" which does not have semantic meanings. FIG. 5 shows part of the VSCN, with concepts of large in-degrees. We can identify several semantic regions formed by these concepts, including traveling, entertainments, wallpapers, and automobile, which correspond to the green, yellow, dark blue, and light blue regions, respectively.

Hereinafter, a method 600 for searching images with the visual semantic complex network system 100 will be discussed.

Generally, given a query image (FIG. 5 (a)), its nearest neighbors in the database are retrieved with a baseline method or any other available method. Based on the initial retrieval result, the semantic meaning of the query image is estimated using a small set of relevant semantic concepts on the VSCN 100. Images under these semantic concepts are then gathered to form a re-ranking pool. Images inside the pool are ranked based on their visual similarity to the query image, and the ranking list is returned (FIG. 5 (f). The VSCN brings two key benefits: (1) as the search space is greatly reduced, the re-ranking pool contains significantly less noise than the entire database, leading to superior retrieval result. (2) The re-ranking pool contains a more manageable number of images than the entire database (a few thousand v.s. millions). It allows the use of more powerful features and similarity measures, further promoting the performance.

Figure 6:
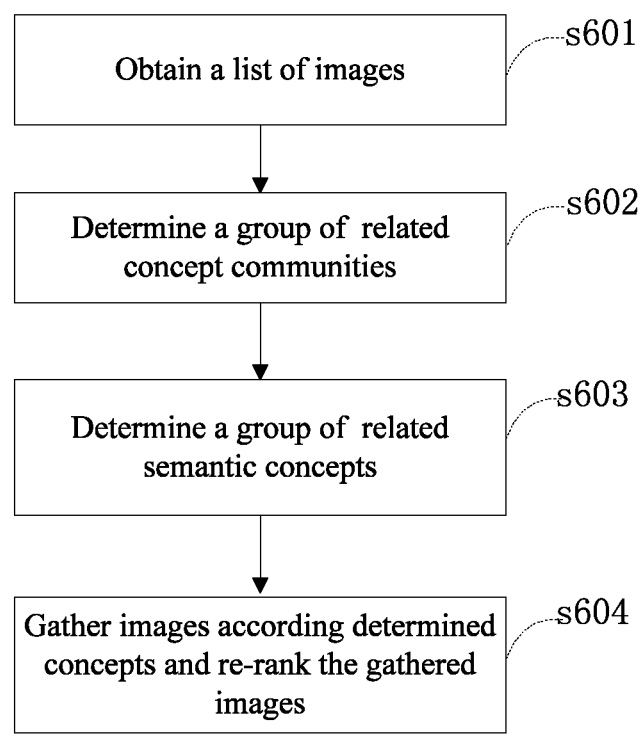
FIG. 6 is a flowchart of a method for searching images with the visual semantic complex network system according to an embodiment of the present application.

To be specific, the method 600 for searching images with the visual semantic complex network system according to an embodiment of the present application will be discussed in referring to FIG. 6. At step 601, a list of images is obtained according to a given image by using any conventional means in the art.

At step S602, a group of close related concept communities will be determined from the list returned from step S601.

The semantic regions suggest the existence of community structures on the VSCN. In the literature of complex networks, a community is referred to as a subgraph with tightly connected nodes. On the VSCN, it corresponds to a group of (for example, closely) related semantic concepts, called a concept community. To find such communities, the inventors adopt the graph-based agglomerative algorithm in the art due to its good performance and high efficiency. The algorithm starts by treating each single node as a cluster, and iteratively merges clusters with largest affinity, measured via the product of in-degrees and out-degrees between the two clusters.

The inventors observe a few interesting facts from the clustering results. First, the size of clusters approximately follows a power-laws distribution, and 10% of the clusters are with size larger than 10. They cover 52% nodes on the VSCN. Second, these clusters correspond to various semantic topics, such as cars, food, plants, and animals.

At step S603, a group of close related semantic concepts will be determined from the communities as determined in step S602.

A key step of our approach is to estimate the semantic meaning of the query image, which is done at two levels. At the community level, it estimates the query image's semantic meaning using a set of concept communities discovered in the above. As concept communities group similar concepts, estimating the relevant communities is more reliable than estimating individual concepts. Then, at the concept level, a smaller set of relevant concepts are further identified from the previously identified communities. Both levels fully exploit the structural information of the VSCN, which makes our approach more robust.

1.1 Community-Level Estimation

The detected concept communities is referred by $\{T_i\}_{i=1}^{K_T}$. Given a query image $I_q$, a list of top-ranked images and their distances to $I_q$ are returned by a baseline retrieval algorithm (e.g. ITQ hashing). From the truncated list $\{(I_k, d_k)\}_{k=1}^{N_I}$, we calculate a relevance score for each $T_i$ as:

$$s(T_i) = \sum_{k=1}^{N_I} \exp\left(\frac{-d_k}{\sigma}\right) \Box \chi[c(I_k), T_i]. \tag{2}$$

$c(I_k)$ is the concept to which the database image $I_k$ belongs. $\chi[c(I_k), T_i]$ is 1 if $c(I_k) \in T_i$ and 0 otherwise.

$$\sigma = \frac{1}{N_I} \sum_{k=1}^{N_I} d_k.$$

After calculating relevance scores for all the communities, we keep the top $N_T$ with the largest relevance scores. The concepts included in these concept communities are aggregated and denoted by $C' = \{c'_i\}_{i=1}^{N_{C'}}$.

1.2 Concept-Level Estimation

The results of community-level estimation enable us to focus on a small subset of concepts $C'$. In order to best identify the most relevant concepts out of $C'$, we jointly leverage two sources of information. The first source is the relevance score derived from the ranking list returned by the baseline retrieval algorithm. Similar to Section 5.1, we compute the initial relevance score for each concept $c'_i \in C'$ as:

$$s(c'_i) = \sum_{k=1}^{N_I} \exp\left(\frac{-d_k}{\sigma}\right) \Box 1[c(I_k) = c'_i], \tag{3}$$

Where $1[\Box]$ is the indicator function, and $\sigma$ is the same as that in Equation 3. As $s(c'_i)$ is not sufficiently reliable, we introduce the second source of information—correlations between semantic concepts—to refine the noisy relevance score. To this end, we further construct a graph $G'(V', E', W')$ by extracting a subgraph from the VSCN, where $V'$ are nodes corresponding to $C'$, $E'$ are edges with both nodes in $V'$, and $W'$ are the weights associated with $E'$. To integrate the two information sources, we conduct a Random Walk with Restart (RWR) on $G'$, characterized by $$p^{n+1} = \alpha P^T p^n + (1-\alpha)\pi, \tag{4}$$

where $p^n$ is the walker's probability distribution over $V'$ at step n. P is the transition matrix derived from $W'$ and $$\pi(i) = s(c'_i) / \sum_i s(c'_i).$$

The physical meaning of Equation 5 can be interpreted as, at each step, the random walker either walks, with probability $\alpha$, along the $E'$ according to the transition matrix P or restarts, with probability $1-\alpha$, from a fixed probability distribution $\pi$. Therefore, the two information sources, incorporated into the two terms on the r.h.s. of Equation 5, respectively, are combined by RWR up to the balance factor $\alpha$.

The equilibrium distribution p of the RWR is known as the personalized PageRank vector, which has the following analytical solution:

$$p = (1-\alpha)(I - \alpha P^T)^{-1}\pi \tag{5}$$

where a larger probability in p indicates higher relevance of the corresponding node. We rank the semantic concepts according to their probability values in p, and take the top $N_C$ to represent the semantic meaning of the query image.

At Step s604, images of the top $N_C$ concepts are gathered and formed a re-ranking pool of the gathered images, which are matched with the query image.

In one aspect of the present application, there is disclosed a new browsing scheme that helps users explore the VSCN 100 and find images of interest is proposed. The user starts browsing by entering a query keyword to the system. Since the size of the VSCN is huge, it provides local views. This scheme allows users to browse two spaces—the query space and the local concept space—each of which only presents a small subgraph of the entire VSCN 100. A query space visualizes semantic concepts generated by the same query. For example, the query space of "apple" contains concepts such as "apple fruit", "apple iphone", "apple pie", and their corresponding images. A local concept space visualizes a centric concept (e.g., "apple iphone") together with its neighbor concepts (e.g. "htc diamond" and "palm pixi"), which may come from different query keywords. In this way, it bridges images of most related concepts and helps users access more images of interest without being limited by their initial queries.

In the browsing process, users can freely switch between the two spaces. A user who chooses a particular concept in the query space enters into the local concept space and the chosen concept becomes the centric concept. The user can then move to a new concept space by choosing a neighboring concept. If the user chooses the centric concept in a local concept space, he will move back to the query space the centric concept belongs to. In this way, users can navigate over the VSCN and search for target images.

The embodiments of the present invention may be implemented using certain hardware, software, or a combination thereof. In addition, the embodiments of the present invention may be adapted to a computer program product embodied on one or more computer readable storage media (comprising but not limited to disk storage, CD-ROM, optical memory and the like) containing computer program codes.

In the foregoing descriptions, various aspects, steps, or components are grouped together in a single embodiment for purposes of illustrations. The disclosure is not to be interpreted as requiring all of the disclosed variations for the claimed subject matter. The following claims are incorporated into this Description of the Exemplary Embodiments, with each claim standing on its own as a separate embodiment of the disclosure.

Moreover, it will be apparent to those skilled in the art from consideration of the specification and practice of the present disclosure that various modifications and variations can be made to the disclosed systems and methods without departing from the scope of the disclosure, as claimed. Thus, it is intended that the specification and examples be consid-

What is claimed is:

1. A visual semantic complex network system, comprising:
a memory configured for storing executable units; and
a processor electronically communicated with the memory and executing the executable units to:
retrieve a plurality of images and a plurality of texts associated with the plurality of images based on one or more query-keywords;
determine semantic concepts and representative images corresponding to the retrieved texts and the retrieved images, respectively;
generate text descriptors and visual descriptors based on the determined semantic concepts and representative images, wherein the text descriptors are generated as one or more vectors comprising a frequency of the semantic concepts within the plurality of retrieved texts and wherein the visual descriptors are generated as one or more binary vectors comprising a hashed representation of each of the plurality of retrieved images;
determine semantic correlations and visual correlations associated with the semantic concepts based on the generated text and visual descriptors, respectively;
generate the visual semantic complex network system as a navigable graph based on combining the determined semantic correlations and the determined visual correlations, wherein the graph includes a plurality of nodes corresponding to the determined semantic concepts;
enter a query keyword to the visual semantic complex network system;
present a query space being a first subgraph of the visual semantic complex network system, the query space containing concepts each comprising the entered query keyword;
present a local concept space being a second subgraph of the visual semantic complex network system in response to selecting the concept in the query space as a centric concept, the local concept space comprising the centric concept and neighbor concepts excluding the entered keyword; and
present the query space in response to selecting the centric concept in the local concept space.

2. The system according to claim 1, wherein the visual semantic complex network system comprises a K-nearest-neighbor graph network system, K is an integer.

3. The system according to claim 2, wherein a semantic correlation and a visual correlation are generated between each two of the concepts, respectively.

4. The system according to claim 3, wherein the processor is configured to,
collect a plurality of text snippets corresponding to the semantic concepts,
determine a term frequency vector of the collected snippets;
truncate the determined vector such that a plurality of terms in the vector with a highest term frequency is maintained; and
normalize the truncated vectors to generate said text descriptors, such that the semantic correlation between each two of the semantic concepts are generated from the normalized vector.

5. The system according to claim 3, wherein the processor is configured to,
encode each of the representative images by a hashing function to generate a binary vector for each retrieved image,
accumulate the generated binary vectors; and
quantize the accumulated vector back to a binary vector as said visual descriptor, such that the visual correlation between each two of the concepts are generated from the binary vector.

6. A method for forming a visual semantic complex network system for Web images, comprising:
retrieving a plurality of images and a plurality of texts associated with the plurality of images based on one or more query keywords;
determining semantic concepts and representative images of the retrieved texts and the retrieved images, respectively;
generating text descriptors and visual descriptors based on the semantic concepts and the representative images, wherein the text descriptors are generated as one or more vectors comprising a frequency of the semantic concepts within the plurality of retrieved texts and wherein the visual descriptors are generated as one or more binary vectors comprising a hashed representation of each of the plurality of retrieved images;
determining semantic correlations and visual correlations associated with of the semantic concepts based on the generated text descriptor and the generated visual descriptor, respectively;
generating the visual semantic complex network system as a navigable graph based on combining the semantic correlations and the visual correlations, wherein the graph includes a plurality of nodes corresponding to the determined semantic concepts;
entering a query keyword to the visual semantic complex network system;
presenting a query space being a first subgraph of the visual semantic complex network system, the query space containing concepts each comprising the entered query keyword;
presenting a local concept space being a second subgraph of the visual semantic complex network system in response to selecting the concept in the query space as a centric concept, the local concept space comprising the centric concept and neighbor concepts excluding the entered keyword; and
presenting the query space in response to selecting the centric concept in the local concept space.

7. The method according to claim 6, wherein the step of determining semantic correlations and visual correlations from the generated text descriptor and the generated visual descriptor comprises:
generating a semantic correlation and a visual correlation between each two of the semantic concepts.

8. The method according to claim 7, wherein the step of generating a semantic correlation between each two of the semantic concepts comprises:
collecting a plurality of text snippets corresponding to the semantic concepts,
determining a term frequency vector of the collected snippets;
truncating the determined-vector such that a plurality of terms in the vector with a highest term frequency is maintained; and normalizing the truncated vectors to generate said text descriptors, the semantic correlation between each two of the semantic concepts are generated from the normalized vectors.

9. The method according to claim 7, wherein the step of determining the visual correlations comprises:
encoding each of the representative images by a hashing function so as to generate a binary vector for each retrieved image,
accumulating the generated binary vectors;
quantizing the accumulated vector back to a binary vector as said visual descriptor; and
determining the visual correlation between each two of the concepts from the binary vectors.

10. A method for searching images with a visual semantic complex network system, comprising:
entering a query keyword to the visual semantic complex network system;
presenting a query space being a first subgraph of the visual semantic complex network system, the query space containing concepts each comprising the entered query keyword;
presenting a local concept space being a second subgraph of the visual semantic complex network system in response to selecting the concept in the query space as a centric concept, the local concept space comprising the centric concept and neighbor concepts excluding the entered keyword;
presenting the query space in response to selecting the centric concept in the local concept space;
obtaining a list of images according to the query keyword;
determining a group of related concept communities from the obtained list;
determining a group of related semantic concepts from the determined communities;
generating visual descriptors based on the related semantic concepts and the determined communities, wherein the visual descriptors are generated as one or more binary vectors comprising a hashed representation of each image in the obtained list of images;
determining images of a top plurality of concepts based on the determined related semantic concepts and the visual descriptors;
forming a re-ranking pool of the determined images, which are matched with the query keyword.

11. A method for browsing images with semantic concepts, comprising:
entering a query keyword into a display system;
generating a plurality of semantic concepts each comprising the entered query keyword based on one or more queries matching the entered keyword;
generating visual descriptors based on the semantic concepts and the one or more queries, wherein the visual descriptors are generated as one or more binary vectors comprising a hashed representation of each image to be browsed;
visualizing the generated semantic concepts in a query space of the display system, based on the visual descriptors; and
switching the query space to a local concept space of the display unit in response to selecting a semantic concept selected from the query space as a centric concept, wherein on the local concept space the selected concept together with its neighbor concepts excluding the entered query keyword are shown;
presenting the query apace in response to selecting the centric concept in the local concept space.

12. The method according to claim 11, further comprising:
selecting another concept in the local concept space; and
switching to another local concept space where said another concept and its neighbor concepts are shown in response to selecting the another local concept.

* * * * *